US011399379B2

(12) United States Patent
Rasool et al.

(10) Patent No.: US 11,399,379 B2
(45) Date of Patent: Jul. 26, 2022

(54) SYSTEMS, METHODS AND APPARATUSES FOR TERRESTRIAL AND NON-TERRESTRIAL NETWORKS INTERFERENCE MITIGATION

(71) Applicant: NOKIA SOLUTIONS AND NETWORKS OY, Espoo (FI)

(72) Inventors: Shahzada Basharat Rasool, Ashburn, VA (US); Jeroen Wigard, Klarup (DK); Rafhael Amorim, Aalborg (DK)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/071,391

(22) Filed: Oct. 15, 2020

(65) Prior Publication Data

US 2022/0124735 A1    Apr. 21, 2022

(51) Int. Cl.
  *H04W 24/08*    (2009.01)
  *H04W 72/12*    (2009.01)
  *H04W 60/00*    (2009.01)

(52) U.S. Cl.
  CPC ....... *H04W 72/1226* (2013.01); *H04W 24/08* (2013.01); *H04W 60/00* (2013.01)

(58) Field of Classification Search
  CPC ......... H04W 56/0005; H04W 56/0045; H04W 72/042; H04W 72/082; H04W 72/1263; H04W 74/006; H04W 74/0833; H04W 76/15; H04W 84/005; H04W 84/06; H04W 52/146; H04W 52/48; H04W 24/08; H04W 60/00; H04W 72/1226; H01Q 1/246; H01Q 1/28; H01Q 1/32
  See application file for complete search history.

(56) References Cited

U.S. PATENT DOCUMENTS

| | | | |
|---|---|---|---|
| 2005/0048980 A1* | 3/2005 | Kumar | H04W 4/12 455/443 |
| 2017/0272131 A1* | 9/2017 | Ananth | H04W 72/082 |
| 2017/0290037 A1* | 10/2017 | Goel | H04W 16/14 |
| 2019/0393954 A1* | 12/2019 | Perdew | G08G 5/0078 |
| 2019/0394770 A1* | 12/2019 | Wang | H04W 56/0045 |
| 2020/0313795 A1* | 10/2020 | Xu | H04L 1/0003 |
| 2020/0404713 A1* | 12/2020 | Sakhnini | H04W 84/06 |
| 2021/0006328 A1* | 1/2021 | Kim | H04L 1/1819 |
| 2021/0029658 A1* | 1/2021 | Mahalingam | H04W 56/0005 |
| 2021/0036769 A1* | 2/2021 | Sorond | H04B 7/18523 |
| 2021/0099933 A1* | 4/2021 | Matsuda | H04W 36/0072 |
| 2021/0119861 A1* | 4/2021 | Tripathi | H04L 5/0048 |
| 2021/0227481 A1* | 7/2021 | Xu | H04W 56/005 |
| 2021/0227490 A1* | 7/2021 | Yiu | H04W 24/02 |
| 2021/0251012 A1* | 8/2021 | Shrestha | H04W 72/042 |
| 2021/0281520 A1* | 9/2021 | Shrestha | H04B 7/18513 |

* cited by examiner

*Primary Examiner* — Jean A Gelin
(74) *Attorney, Agent, or Firm* — Squire Patton Boggs (US) LLP

(57) ABSTRACT

Systems, methods, apparatuses, and computer program products for interference coordination between non-terrestrial network and terrestrial network stations are provided. One method may include exchanging, by a non-terrestrial network node, round trip time (RTT) information with at least one terrestrial network node. The method may also include informing the at least one terrestrial network node of resources scheduled at the non-terrestrial network node for one or more user equipment (UEs) to coordinate interference mitigation with the at least one terrestrial network node.

26 Claims, 7 Drawing Sheets

SYSTEMS, METHODS AND APPARATUSES FOR TERRESTRIAL AND NON-TERRESTRIAL NETWORKS INTERFERENCE MITIGATION

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for interference coordination between terrestrial and non-terrestrial networks.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

One embodiment is directed to a method, which may include exchanging, by a non-terrestrial network node, round trip time (RTT) information with at least one terrestrial network node, and informing the at least one terrestrial network node of resources scheduled at the non-terrestrial network node for one or more user equipment (UEs) to coordinate interference mitigation with the at least one terrestrial network node.

Another embodiment is directed to an apparatus including at least one processor and at least one memory comprising computer program code. The at least one memory and computer program code configured, with the at least one processor, to cause the apparatus at least to exchange round trip time (RTT) information with at least one terrestrial network node, and to inform the at least one terrestrial network node of resources scheduled at the apparatus for one or more user equipment (UEs) to coordinate interference mitigation with the at least one terrestrial network node.

Another embodiment is directed to an apparatus including means for exchanging round trip time (RTT) information with at least one terrestrial network node, and means for informing the at least one terrestrial network node of resources scheduled at the apparatus for one or more user equipment (UEs) to coordinate interference mitigation with the at least one terrestrial network node.

Another embodiment is directed to a computer readable medium comprising program instructions stored thereon for causing an apparatus to perform a process including exchanging round trip time (RTT) information with at least one terrestrial network node, and informing the at least one terrestrial network node of resources scheduled at the apparatus for one or more user equipment (UEs) to coordinate interference mitigation with the at least one terrestrial network node.

Another embodiment is directed to a method, which may include exchanging, by a terrestrial network node, round trip time (RTT) information with at least one non-terrestrial network node, receiving, from the at least one non-terrestrial network node, an indication of resources scheduled at the at least one non-terrestrial network node for one or more user equipment (UEs), and using at least the round trip time (RTT) information and the received indication of the scheduled resources to coordinate interference mitigation with the at least one non-terrestrial network node.

Another embodiment is directed to an apparatus including at least one processor and at least one memory comprising computer program code. The at least one memory and computer program code configured, with the at least one processor, to cause the apparatus at least to exchange round trip time (RTT) information with at least one non-terrestrial network node, receive, from the at least one non-terrestrial network node, an indication of resources scheduled at the at least one non-terrestrial network node for one or more user equipment (UEs), and use at least the round trip time (RTT) information and the received indication of the scheduled resources to coordinate interference mitigation with the at least one non-terrestrial network node.

Another embodiment is directed to an apparatus that may include means for exchanging round trip time (RTT) information with at least one non-terrestrial network node, means for receiving, from the at least one non-terrestrial network node, an indication of resources scheduled at the at least one non-terrestrial network node for one or more user equipment (UEs), and means for using at least the round trip time (RTT) information and the received indication of the scheduled resources to coordinate interference mitigation with the at least one non-terrestrial network node.

Another embodiment is directed to a computer readable medium comprising program instructions stored thereon for causing an apparatus to perform a process including exchanging round trip time (RTT) information with at least one non-terrestrial network node, receiving, from the at least one non-terrestrial network node, an indication of resources scheduled at the at least one non-terrestrial network node for one or more user equipment (UEs), and using at least the round trip time (RTT) information and the received indication of the scheduled resources to coordinate interference mitigation with the at least one non-terrestrial network node.

BRIEF DESCRIPTION OF THE DRAWINGS

For proper understanding of example embodiments, reference should be made to the accompanying drawings, wherein.

DETAILED DESCRIPTION

Figure 1:
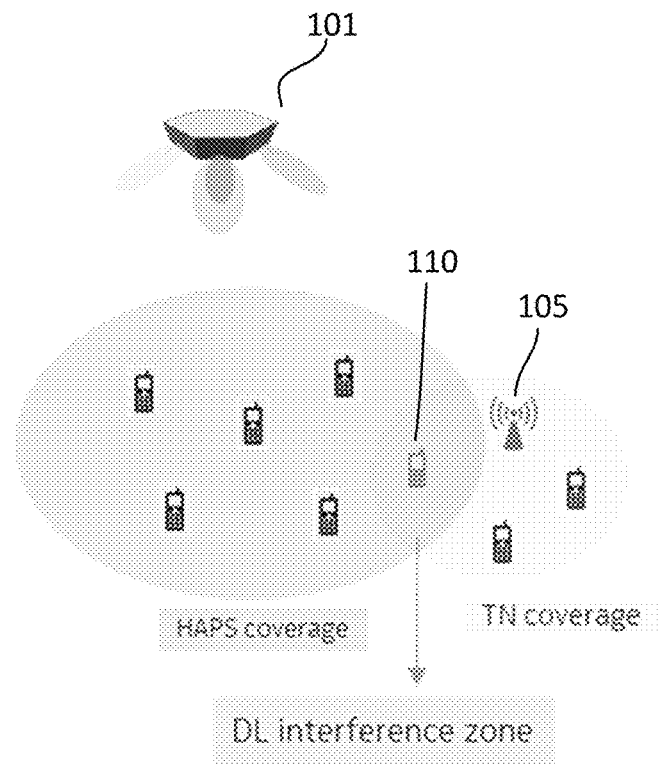
FIG. 1 shows an example system diagram illustrating radio interference resulting from a high altitude platform station (HAPS) service link and terrestrial network (TN) radio link sharing a radio frequency, according to one example.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for interference coordination between non-terrestrial network (e.g., HAPS) and terrestrial network stations, e.g., for low frequency bands, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

High altitude platform stations (HAPS) is a new approach of telecommunication infrastructure solution, which may be used at least for rural and remote areas based on stratospheric airborne platforms. The HAPS are proposed to operate at altitudes, for example between 3 to 50 km, to cover a service area up to 1,000 kilometres (km) in diameter and 800,000 square km depending on the minimum elevation angle accepted from the user's location. HAPS can be based on balloons or on solar powered high-altitude planes, for example. In the $3^{rd}$ generation partnership project (3GPP), HAPS may be considered as non-terrestrial networks (NTN). In addition to HAPS, examples of NTN may include low earth orbit (LEO) and geostationary orbit (GEO) satellites. As an example, NTN or HAPS can be deployed to cover holes in terrestrial network (TN) or to extend radio coverage in remote, less populated areas.

For NTN in general (including HAPS) there is a service link between satellite or HAPS and UE(s), and a feeder link between satellite or HAPS and ground station(s). The feeder link may be used to connect the HAPS to the core network and, in some architectures, some or all components of the gNB may even be on the ground. In certain embodiments described herein, bent pipe or transparent HAPS are considered, in which the radio functionality resides on the ground and HAPS act as a radio frequency (RF) repeater. Transparent HAPS (and satellites) may be characterized by large round trip times (RTT), since the RF signal has to traverse feeder and service links.

It is noted that example embodiments described herein are not just applicable for HAPS, but are also applicable in general for NTN networks with transparent architecture, i.e., in which the gNB is on the ground and the signal needs to travel a long time to get to the UE. For purposes of illustration, example embodiments discussed below may be described with respect to HAPS; however, it should be understood that example embodiments can be applied to any type of NTN network or the like.

When HAPS are deployed to extend coverage or to fill-in coverage holes by a mobile network operator, radio interference between the terrestrial network (TN) radio nodes (which may be referred to as TN radio nodes or TN gNB) and HAPS is likely to occur. The radio interference, both in the downlink (DL) and uplink (UL) direction, is a result of the HAPS service link and TN radio link sharing the same radio frequency. FIG. 1 shows an example illustrating the radio interference resulting from the HAPS service link and TN radio link sharing a radio frequency, which may degrade performance and can even result in outage. As illustrated in the example of FIG. 1, the coverage area of a HAPS 101 and the coverage area of a TN radio node 105 results in an interference zone at least for UE 110. It is noted that FIG. 1 illustrates just one example and other examples of such radio interference are of course possible according to other example embodiments.

More commonly, operators use low frequency bands (<2 GHz) for wide area coverage due to better propagation characteristics. While these low frequency bands offer wide area coverage, the downside is the unavailability of user specific beamforming. Usually 2×2 cross-pol panel array, connected to two transmitter-receiver units (TXRUs), is deployed in each sector of a TN. Similarly, on the HAPS, in particular for transparent HAPS, no advanced beamforming capabilities are available to save payload weight and power. Due to the movement of HAPS (deterministic or random) and their wide ground area coverage (e.g., 20-100 km in diameter), solutions are needed to reduce interference between HAPS and TN nodes when they both share a radio frequency. Due to (possibly random) HAPS movement, the interference can become quite problematic to the point that radio link reliability can be severely impacted.

Therefore, certain example embodiments may be directed to methods for interference coordination between HAPS and terrestrial network stations, e.g., for low frequency bands. While some methods to coordinate radio resources or to mitigate interference amongst (terrestrial) radio nodes are available, HAPS and TN interference coordination and mitigation is a new problem due to wide-area HAPS coverage, light payload requirements on HAPS, lower processing capabilities on HAPS and especially when HAPS are moving with respect to TN nodes. In some example embodiments described herein, transparent HAPS may be considered with one-way delay of greater than 1 ms, i.e., where the service link and feeder link span more than 300 km.

As will be discussed in more detail below, certain embodiments may provide that, in the case of HAPS with a transparent architecture, the longer delay from gNB to UE is utilized to coordinate the scheduling. For example, in an embodiment, the HAPS node (gNB) may exchange RTT information with a relevant node (gNB) of the TN. Further, the HAPS network node may inform the relevant TN node of the HAPS node's scheduling decisions. Then, the TN node may take into account the RTT to perform interference coordination action(s), e.g., by scheduling orthogonal resources, using different power settings, and/or using different modulation and coding on the resources indicated by the HAPS node in the slots indicated by the RTT.

Figure 2:
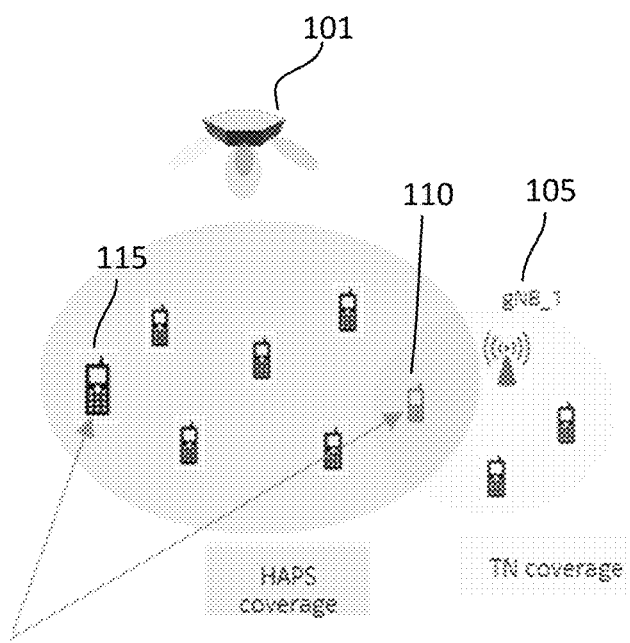
FIG. 2 shows an example system diagram illustrating a HAPS coverage area and TN coverage area, according to one example.

In some embodiments, it may be assumed that HAPS and TN use the same frequency range 1 (FR1) frequency division duplex (FDD) frequency in the service link. For transparent HAPS, it may be assumed that a one-way delay of >=1 ms, which implies a distance of >=300 km for service and feeder link. In particular, a HAPS node or gNB (on the ground) makes a scheduling decision at to and UEs served by the HAPS receive the signal at $t_0+RTT/2$, where RTT is the round trip time traversing the service and feeder link. The following HAPS/LEO specific conditions may be observed: (a) HAPS connected UE substantially always transmits at maximum power regardless of location in a HAPS cell, (b) HAPS drift around and, thus, interfering TN nodes may change over time, and (c) HAPS (or LEO) cell area (~100 km radius) is much larger than TN cell area (~10 km radius) and not all UE served by HAPS interfere with TN nodes or UEs served by TN nodes. FIG. 2 illustrates an example depicting a HAPS 101 having a larger service area, where some UE(s) do not cause interference even if they share resource assignments with UE(s) in the coverage area of TN node 105. For instance, as illustrated in the example of FIG. 2, UE 110 may have similar timing advance (TA) and reference signal received power (RSRP) to UE 115, but just UE 110 might interfere with UL of TN node 105 (gNB 1).

As mentioned above, from an interference perspective, there may be DL interference or UL interference. With DL interference, HAPS (or TN gNB) DL transmission interferes with UE DL reception. With UL interference, UE uplink transmission interferes with TN (or HAPS) gNB reception.

Accordingly, some example embodiments can provide a solution at least for DL interference scenarios. One embodiment may make use of larger RTT in HAPS for interference coordination. In addition, according to an embodiment, UE location and TN gNB location knowledge may be used for interference coordination. Mechanisms to obtain UE and (interfering) TN gNB location are discussed in detail below.

Figure 3:
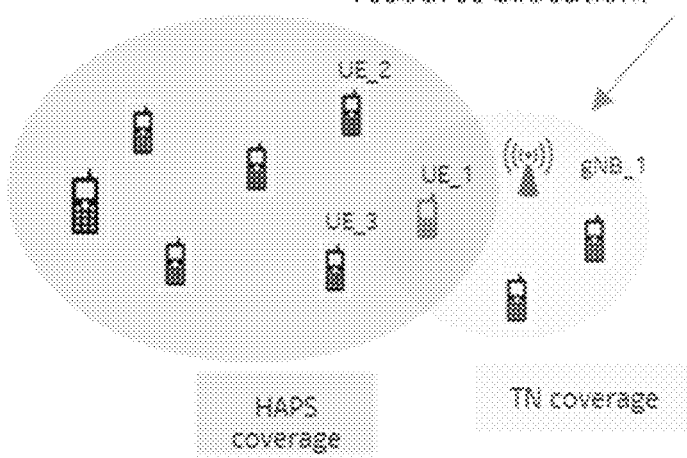
FIG. 3 illustrates an example diagram of a downlink (DL) interference scenario, according to one example embodiment.

FIG. 3 illustrates an example diagram of a DL interference scenario, according to one example embodiment. In an embodiment, at each slot, taking into account scheduled UE location and TN gNB location, HAPS gNB may forward a list of scheduled resource block(s) (RB) over to the relevant TN gNBs. Therefore, in the example of FIG. 3, the HAPS gNB may share resource allocations to TN gNB_1; thus, TN gNB_1 may receive information about UE_1, UE_2, and UE_3. According to an embodiment, the HAPS gNB may use a relative narrowband Tx power (RNTP) information element (IE), which is defined in 3GPP load information X2 message, to share the resource allocations with the TN gNB_1.

According to certain embodiments, the TN gNB may use the resource allocation information, as received from the HAPS gNB, to schedule UEs in the future slot indicated by the HAPS RTT. For example, in an embodiment, the TN gNB may schedule UE(s) in the future slot by reducing DL power in the physical resource blocks (PRBs) indicated by the RNTP message or avoiding scheduling, on those PRBs, UE(s) which will be interfered by the HAPS gNB. Additionally or alternatively, the TN gNB may schedule UE(s) in the future slot by using more robust coding (MCS) in the PRBs indicated by the RNTP message.

With certain example embodiments, there can be a possibility that HAPS gNB becomes a master node and dictates resource assignment to TN gNBs. However, this can be avoided by employing traditional Inter-Cell Interference Coordination (ICIC) techniques to periodically (e.g., every several seconds) communicate TN node decisions and/or measurements to HAPS gNB. Also, by following the procedures outlined above, there is minimal interference from TN DL to HAPS UE DL.

Furthermore, some example embodiments can provide a solution at least for UL interference scenarios. Some guiding principles for UL coordination include taking advantage of longer RTT for HAPS and UE and interfering node location knowledge to make efficient resource coordination decisions. It can be observed that a UE served by HAPS usually transmits at maximum power and thus may cause UL interference noise rise in TN gNBs.

Therefore, in certain example embodiments, when HAPS gNB DL and UL system frame number (SFN) are time aligned, HAPS UEs may transmit with timing advance (TA) of 1 RTT. If UL is scheduled for a UE, DCI indicates the slot offset $K_2$ relative to current slot. At each slot, taking into account scheduled UE location and TN gNB location, HAPS gNB may forward a list of assigned RB over to the relevant TN gNBs. Then, TN gNB(s) may use this information and HAPS RTT to schedule (its own) UEs in UL direction in a next slot. For example, TN gNB(s) may assign non-overlapping resources such the PRBs which are being interfered by the HAPS UEs in the vicinity at the slots indicated through the RTT are not used by the TN UEs. Additionally or alternatively, TN gNB(s) may use more robust coding (MCS) for the PRBs which are being interfered by the HAPS UEs in the vicinity at the slots indicated through the RTT.

It may be observed that, if a UE is power limited, just a subset of resources are assigned from available resources. Nevertheless, interference may significantly increase if user density is sufficiently high. In this scenario, two-way co-ordination may be needed; for example, a TN gNB may use traditional load Information X2 IE to indicate UL interference to HAPS gNB or to communicate its priority to use certain resources. It is noted that these procedures can also ensure that there is minimal interference from TN UE UL to HAPS gNB UL.

Figure 4:
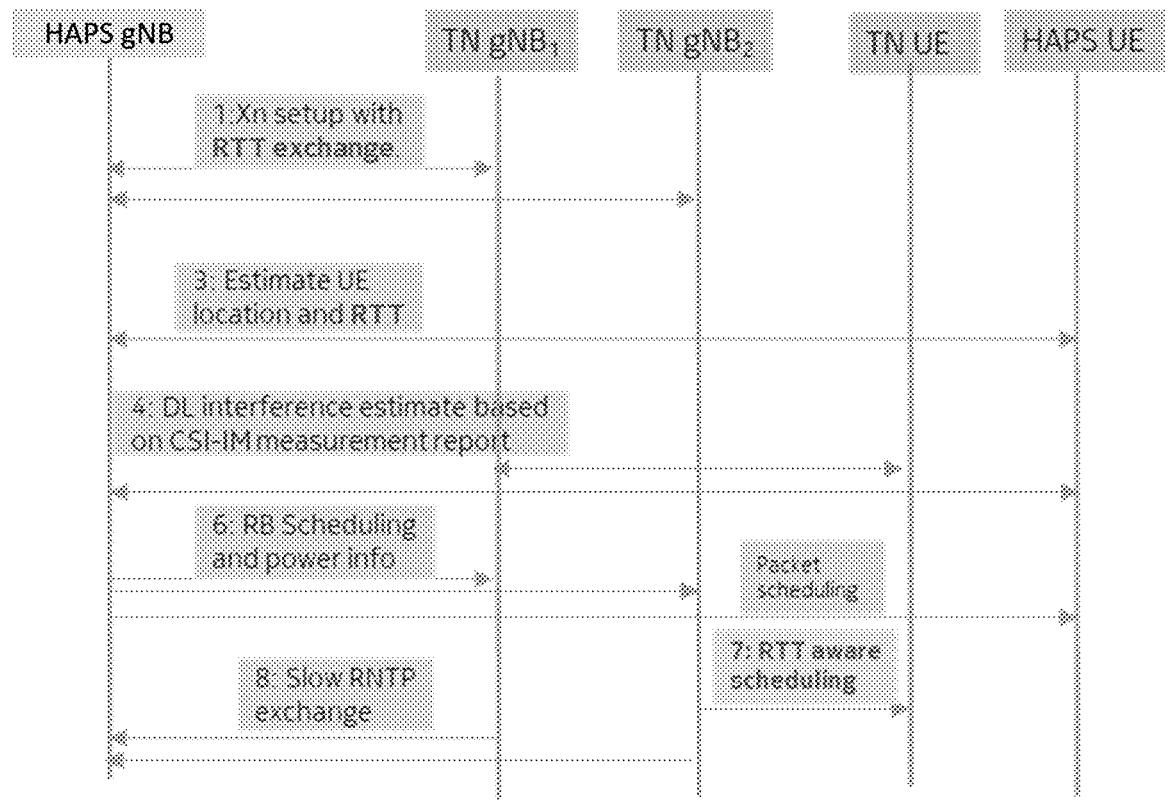
FIG. 4 illustrates an example signaling flow diagram for DL interference mitigation and/or coordination, according to an example embodiment.

FIG. 4 illustrates an example signaling flow diagram for DL interference mitigation and/or coordination, according to an example embodiment. As illustrated in the example of FIG. 4, at 1, HAPS gNB and TN gNBs may perform Xn setup with RTT exchange. In an embodiment, the HAPS gNB may estimate maximum RTT from cell edge UE and provide this RTT to the TN gNBs. According to an embodiment, HAPS may obtain TN gNB location from core network and may determine a rough estimate of coverage overlap. A rough estimate of location may also be obtained by instructing a UE connected with HAPS to perform neighbor measurements; an approximate direction of TN gNB may be sufficient. As also illustrated in the example of FIG. 4, at 3, HAPS may estimate a UE location based on timing advance. HAPS may keep track of TA commands issued to a UE to keep rough estimate of location and RTT.

As further illustrated in the example of FIG. 4, at 4, HAPS and TN gNB may periodically transmit CSI-IM. The UE may measure interference signal and report back to respective serving gNB. In an embodiment, HAPS may refine HAPS UE location based on timing advance and CSI-IM measurements. As illustrated in the example of FIG. 4, at 6, at every slot, HAPS gNB may send scheduled RB for UE in interference zone with Tx power to relevant TN gNB. For example, the HAPS gNB may use RNTP IE in load message to communicate this information. In particular, no RB allocation of non-interference zone UE is shared, i.e., set RNTP of those RBs to zero. As also illustrated in the example of FIG. 4, at 7, TN gNB may take this information and RTT into account when scheduling cell edge UE (those which reported sufficient interference from HAPS CSI-IM transmission). Then, at 8, TN gNB may periodically send its own RNTP message to HAPS to ensure HAPS does not starve it of resources.

Figure 5:
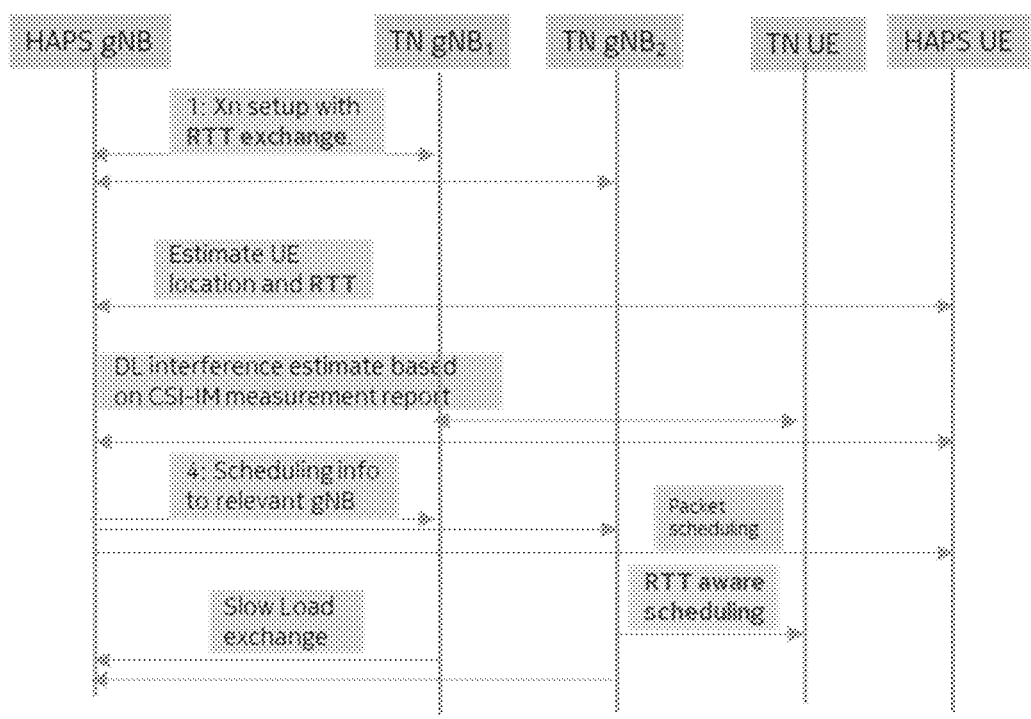
FIG. 5 illustrates an example signaling flow diagram for uplink (UL) interference mitigation and/or coordination, according to an example embodiment.

FIG. 5 illustrates an example signaling flow diagram for UL interference mitigation and/or coordination, according to an example embodiment. As illustrated in the example of FIG. 5, at 1, HAPS gNB and neighbor TN gNBs may perform Xn setup with RTT (maximum timing advance) exchange. As discussed above, in an embodiment, the HAPS gNB may estimate maximum RTT from cell edge UE and provide this RTT to the TN gNBs. As discussed above with respect to procedures 2-5 of FIG. 4, HAPS can obtain an estimate of UE in interference zone with respective TN gNB. In an embodiment, HAPS and TN gNB may periodically measure uplink noise rise in each RB from out of cell UEs. As shown in the example of FIG. 5, at 4, at every slot, taking into account scheduled UE location and TN gNB location, HAPS gNB may forward a list of assigned UL RB to the relevant TN gNBs. For this purpose, in one example, existing uplink high interference indication IE can be used. The TN gNBs may take this information and RTT into account when scheduling cell edge UE. According to certain embodiments, TN gNBs and HAPS may periodically exchange overload indicator and high interference indication to ensure HAPS does not starve TN of resources. In some embodiments, if interference becomes very high in the UL direction, TN/HAPS gNB can also use ABS or low power subframes (LPS).

In traditional heterogeneous network (HetNet) scenarios, RTT is much smaller than 1 ms, which places stringent latency requirements on backhaul connections to support X2 load information exchange in a timely manner to support scheduling decisions which are taken every slot (1 ms for LTE). For transparent HAPS with large RTT, this latency constraint may be relaxed and scheduling decisions can be made taking into account neighbor information. If the information transfer becomes an issue, for example due to the need of scheduling information exchange in every slot through X2 or Xn, some embodiments may provide certain enhancements. For example, in an embodiment, it may be provided that HAPS gNB can exchange information every X number of slots. According to a further embodiment, existing interference coordination messages defined for LTE and NR over X2, such as load information IE, can be enhanced to include RTT information in each exchange. As an example, RNTP IE (or uplink high interference indication) does not include a time factor. In some embodiments, since RTT may change with time, for example due to feeder link change or deterministic movement of a satellite in the sky, this IE may be extended such that it sends the RNTP and current RTT.

Additionally, according to some example embodiments, RTT of a HAPS or NTN node can be inferred from radio node locations obtained through core network or configured manually or automatically through an algorithm that keeps track of RTT changes in the network due to movement of radio nodes or their configuration changes.

Figure 6A:
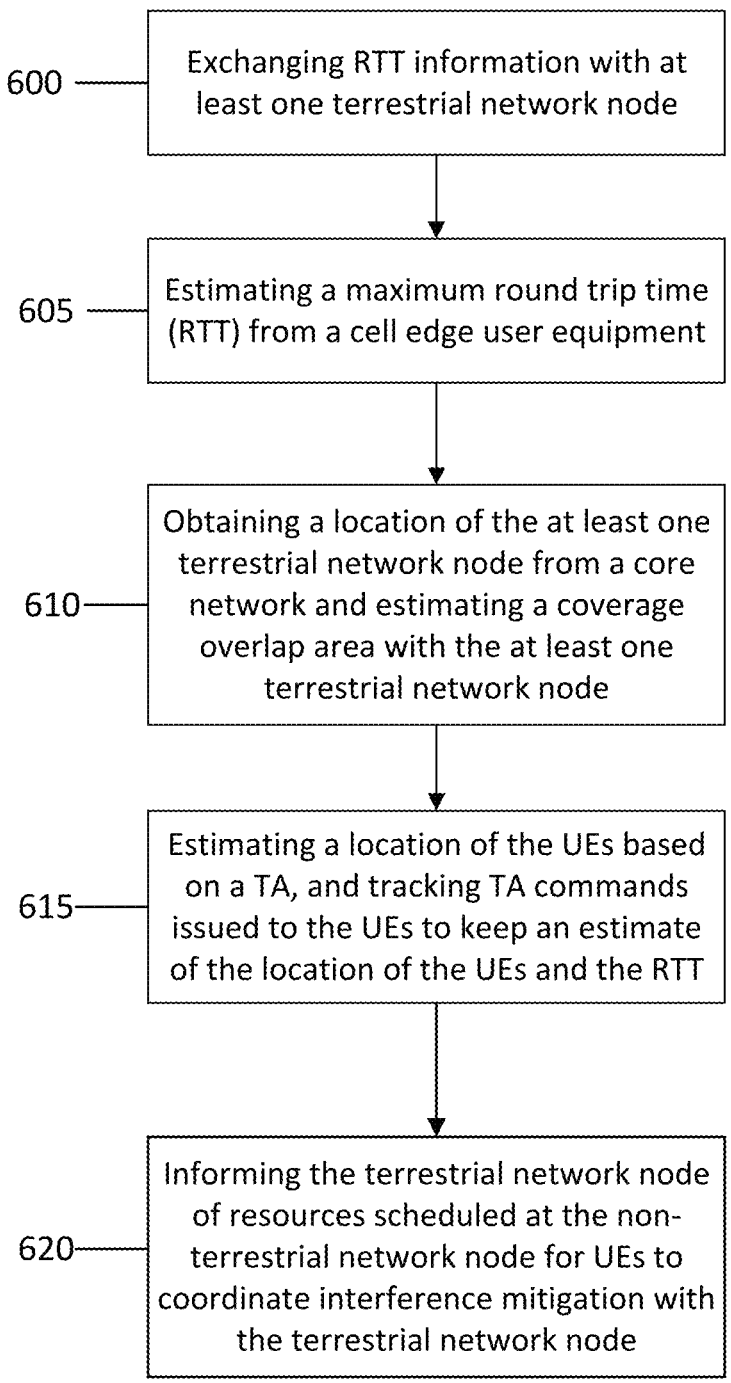
FIG. 6A illustrates an example flow diagram of a method, according to an embodiment.

FIG. 6A illustrates an example flow diagram of a method of interference coordination between non-terrestrial network and terrestrial network nodes or stations, according to an embodiment. According to some embodiments, the method of FIG. 6A may be performed by a network node, host, or server in a communications network or serving such a network, such as a satellite, base station, a Node B, an evolved Node B (eNB), 5G Node B or access point, next generation Node B (NG-NB or gNB), transmission-reception point (TRP), high altitude platform station (HAPS), integrated access and backhaul (IAB) node, and/or WLAN access point, or the like. For example, according to an embodiment, the method of FIG. 6A, may be performed by a non-terrestrial network node or station, such as a HAPS.

As illustrated in the example of FIG. 6A, the method may include, at 600, exchanging RTT information with at least one terrestrial network node. In some embodiments, the method may also include, at 605, estimating a maximum round trip time (RTT) from a cell edge user equipment. In an embodiment, the method may include, at 610, obtaining a location of the at least one terrestrial network node from a core network and estimating a coverage overlap area with the at least one terrestrial network node. According to an embodiment, the method may include, at 615, estimating a location of the one or more user equipment (UEs) based on a timing advance, and tracking timing advance commands issued to the one or more user equipment (UEs) to keep an estimate of the location of the one or more user equipment (UEs) and the round trip time (RTT).

As further illustrated in the example of FIG. 6A, the method may include, at 620, informing the at least one terrestrial network node of resources scheduled at the non-terrestrial network node for one or more user equipment (UEs) to coordinate interference mitigation with the at least one terrestrial network node. For example, the terrestrial network node may take into account the RTT to perform interference coordination actions, for instance, by scheduling orthogonal resources, using different power settings and/or using different modulation and coding schemes on the resources indicated by the non-terrestrial network node in the slots indicated by the RTT.

In some embodiments, the informing 620 may include sending a list of scheduled resource blocks (RBs) for at least one user equipment in the coverage overlap area to the at least one terrestrial network node, taking into account scheduled user equipment location and the location of the at least one terrestrial network node. For instance, the list of scheduled RBs may be sent in a relative narrowband transmit power information element. In a further embodiment, the informing 620 may include sending a list of assigned resource blocks (RBs) for at least one user equipment in the coverage overlap area to the at least one terrestrial network node, taking into account scheduled user equipment location and the location of the at least one terrestrial network node. In one embodiment, the method may also include periodically receiving an indication of scheduling decisions from the at least one terrestrial network node.

Figure 6B:
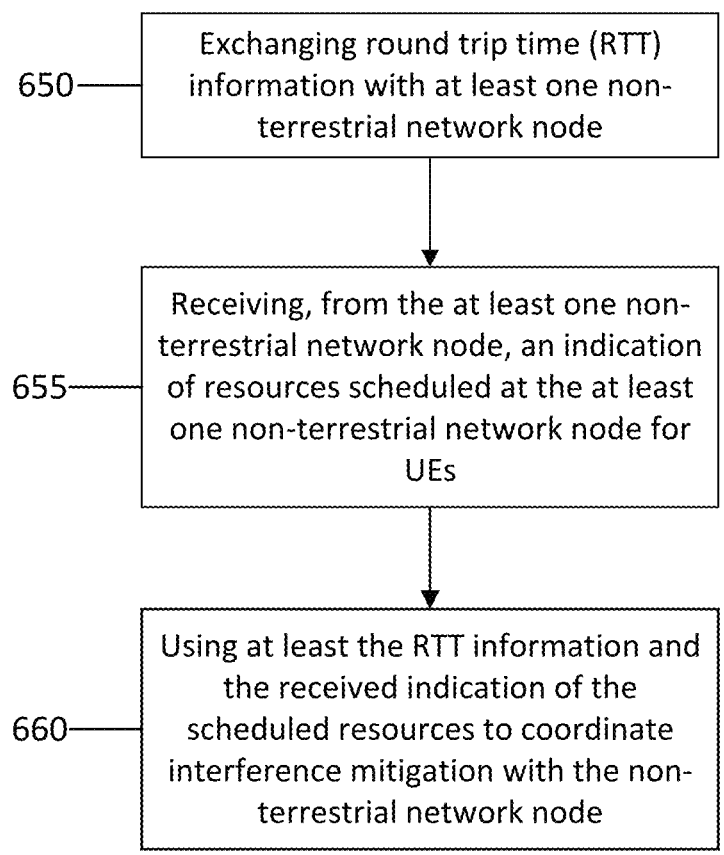
FIG. 6B illustrates an example flow diagram of a method, according to an embodiment.

FIG. 6B illustrates an example flow diagram of a method of interference coordination between non-terrestrial network and terrestrial network nodes or stations, according to an embodiment. According to some embodiments, the method of FIG. 6B may be performed by a network node, host, or server in a communications network or serving such a network, such as a satellite, base station, a Node B, an evolved Node B (eNB), 5G Node B or access point, next generation Node B (NG-NB or gNB), transmission-reception point (TRP), integrated access and backhaul (IAB) node, and/or WLAN access point, or the like. For example, according to an embodiment, the method of FIG. 6B, may be performed by a terrestrial network node or station, such as a gNB.

As illustrated in the example of FIG. 6B, the method may include, at 650, exchanging round trip time (RTT) information with at least one non-terrestrial network node, such as a HAPS node or HAPS gNB. In an embodiment, the method may include, at 655, receiving, from the at least one non-terrestrial network node, an indication of resources scheduled at the at least one non-terrestrial network node for one or more user equipment (UEs).

In some embodiments, the receiving 655 may include receiving a list of scheduled resource blocks (RBs) for at least one user equipment in an area of coverage overlap between the terrestrial network node and the non-terrestrial network node. For example, the list of the scheduled RBs may be received in a relative narrowband transmit power information element. According to a further embodiment, the receiving 655 may include receiving a list of assigned resource blocks (RBs) for at least one user equipment in an area of coverage overlap between the terrestrial network node and the non-terrestrial network node.

According to an embodiment, the method of FIG. 6B may include, at 660, using at least the round trip time (RTT) information and the received indication of the scheduled resources to coordinate interference mitigation with the at least one non-terrestrial network node. For example, the RTT may be taken into account to perform interference coordination action(s), for instance, by scheduling orthogonal resources, using different power settings and/or using different modulation and coding on the resources indicated by the non-terrestrial network node in the slots indicated by the RTT. In an embodiment, the using 660 may include reducing downlink power in the resource blocks (RBs) indicated by the at least one non-terrestrial network node or avoiding scheduling user equipment (UEs) that will be interfered by the non-terrestrial network node in the indicated resource blocks (RBs), and/or using a more robust coding and modulation scheme (MCS) in the indicated resource blocks (RBs). In a further embodiment, the using 660 may include assigning non-overlapping resources such that resource blocks (RBs) that are being interfered by user equipment (UEs) served by the non-terrestrial network node at slots indicated through the round trip time are not used by user equipment (UEs) served by the terrestrial network node, and/or using a more robust coding and modulation scheme (MCS) for resource blocks (RBs) that are being interfered by user equipment (UEs) served by the non-terrestrial network node at slots indicated through the round trip time. In some embodiments, the method may include periodically transmitting, to the non-terrestrial network node, an indication of scheduling decisions made at the terrestrial network node.

Figure 7A:
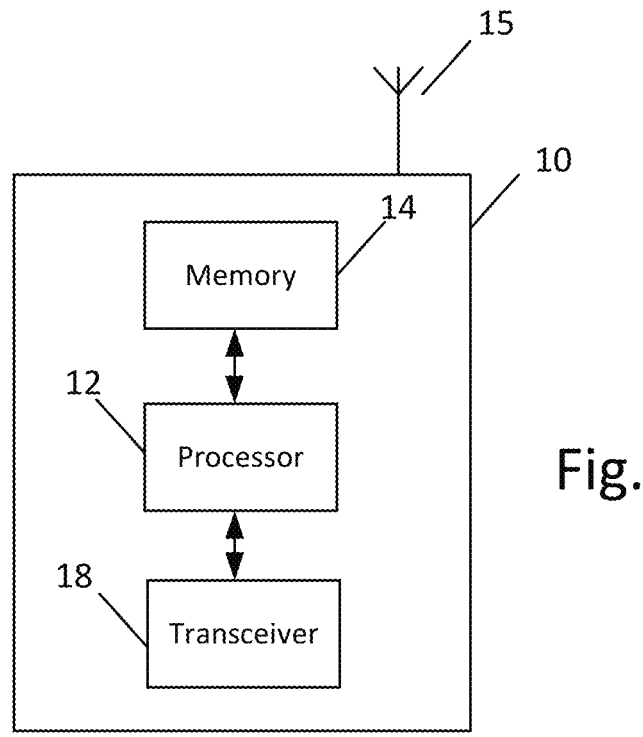
FIG. 7A illustrates an example block diagram of an apparatus, according to an embodiment.

FIG. 7A illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), transmission receive point (TRP), high altitude platform station (HAPS), integrated access and backhaul (IAB) node, and/or WLAN access point, associated with a radio access network, such as a LTE network, 5G or NR. In one example embodiment, apparatus 10 may be a non-terrestrial network node or gNB, such as a HAPS node or gNB.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7A.

As illustrated in the example of FIG. 7A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples.

While a single processor 12 is shown in FIG. 7A, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and/or receive information. The transceiver 18 may include, for example, a plurality of radio interfaces that may be coupled to the antenna(s) 15, or may include any other appropriate transceiving means. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (e.g., digital-to-analog converters and the like), mappers, a Fast Fourier Transform (FFT) module, and/or the like, e.g., to generate symbols or signals for transmission via one or more downlinks and to receive symbols (e.g., via an uplink).

As such, transceiver 18 may be configured to modulate information on to a carrier waveform for transmission by the antenna(s) 15 and to demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input device and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, TRP, HAPS, IAB node, WLAN access point, or the like. In one example embodiment, apparatus 10 may be a non-terrestrial network node or HAPS gNB. For example, in some embodiments, apparatus 10 may be configured to perform one or more of the processes depicted in any of the flow charts or signaling diagrams described herein, such as those illustrated in FIG. 4, 5, 6A or 6B. In some embodiments, as discussed herein, apparatus 10 may be configured to perform a procedure relating to coordinating interference mitigation with a terrestrial network node(s) or gNB(s), for example.

In some embodiments, apparatus 10 may be controlled by memory 14 and processor 12 to exchange RTT information with at least one terrestrial network node. In some embodiments, apparatus 10 may be controlled by memory 14 and processor 12 to estimate a maximum round trip time (RTT) from a cell edge user equipment. In an embodiment, apparatus 10 may be controlled by memory 14 and processor 12 to obtain a location of the at least one terrestrial network node from a core network and estimate a coverage overlap area with the at least one terrestrial network node. According to an embodiment, apparatus 10 may be controlled by memory 14 and processor 12 to estimate a location of the one or more user equipment (UEs) based on a timing advance, and track timing advance commands issued to the one or more user equipment (UEs) to keep an estimate of the location of the one or more user equipment (UEs) and the round trip time (RTT).

In an embodiment, apparatus 10 may be controlled by memory 14 and processor 12 to inform the at least one terrestrial network node of resources scheduled at the non-terrestrial network node for one or more user equipment (UEs) to coordinate interference mitigation with the at least one terrestrial network node. For example, the terrestrial network node may take into account the RTT to perform interference coordination actions, for instance, by scheduling orthogonal resources, using different power settings and/or using different modulation and coding schemes on the resources indicated by the non-terrestrial network node in the slots indicated by the RTT.

In some embodiments, to inform the at least one terrestrial network node of the scheduled resources, apparatus 10 may be controlled by memory 14 and processor 12 to send a list of scheduled resource blocks (RBs) for at least one user equipment in the coverage overlap area to the at least one terrestrial network node, taking into account scheduled user equipment location and the location of the at least one terrestrial network node. For instance, the list of scheduled RBs may be sent in a relative narrowband transmit power information element. In a further embodiment, to inform the at least one terrestrial network node of the scheduled resources, apparatus 10 may be controlled by memory 14 and processor 12 to send a list of assigned resource blocks (RBs) for at least one user equipment in the coverage overlap area to the at least one terrestrial network node, taking into account scheduled user equipment location and the location of the at least one terrestrial network node. In one embodiment, apparatus 10 may be controlled by memory 14 and processor 12 to periodically receive an indication of scheduling decisions from the at least one terrestrial network node.

Figure 7B:
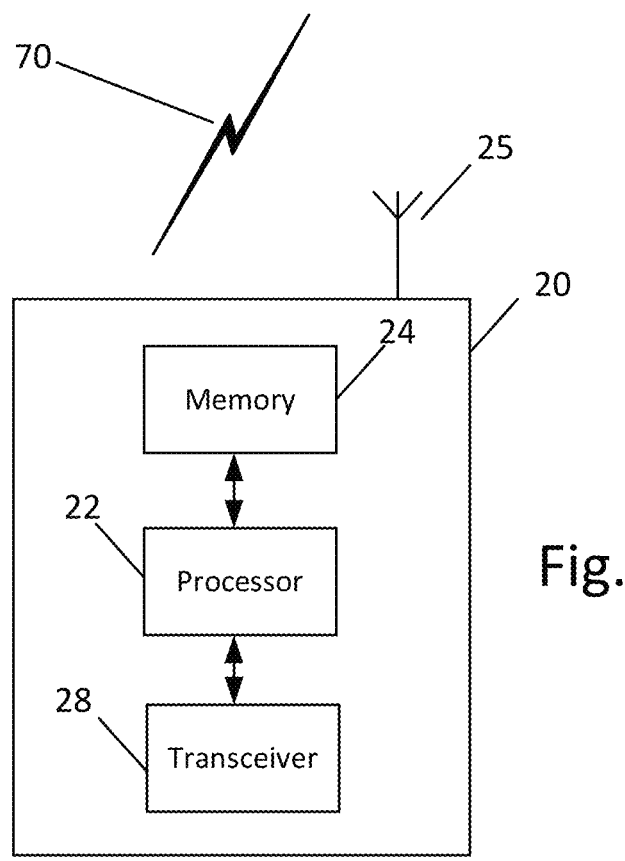
FIG. 7B illustrates an example block diagram of an apparatus, according to an embodiment.

FIG. 7B illustrates an example of an apparatus 20 according to another embodiment. In an embodiment, apparatus 20 may be a node or element in a communications network or associated with such a network, such as a satellite, base station, a Node B, an evolved Node B (eNB), 5G Node B or access point, next generation Node B (NG-NB or gNB), transmission receive point (TRP), high altitude platform station (HAPS), integrated access and backhaul (IAB) node, and/or WLAN access point, associated with a radio access network, such as a LTE network, 5G or NR. In one example embodiment, apparatus 20 may be a terrestrial network node, such as a gNB.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7B.

As illustrated in the example of FIG. 7B, apparatus 20 may include or be coupled to a processor 22 (or processing means) for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media, or other storage means. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 (or transceiving means) configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device) or input/output means. In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, in certain embodiments, apparatus 20 may be a network node or RAN node, such as a base station, access point, Node B, eNB, gNB, TRP, HAPS, IAB node, WLAN access point, or the like. In one example embodiment, apparatus 20 may be a terrestrial network node or gNB. For example, in some embodiments, apparatus 20 may be configured to perform one or more of the processes depicted in any of the flow charts or signaling diagrams described herein, such as those illustrated in FIG. 4, 5, 6A or 6B. In some embodiments, as discussed herein, apparatus 20 may be configured to perform a procedure relating to coordinating interference mitigation with a non-terrestrial network node(s) or HAPS gNB(s), for example.

For example, in some embodiments, apparatus 20 may be controlled by memory 24 and processor 22 to exchange round trip time (RTT) information with at least one non-terrestrial network node, such as a HAPS node or HAPS gNB. In an embodiment, apparatus 20 may be controlled by memory 24 and processor 22 to receive, from the at least one non-terrestrial network node, an indication of resources scheduled at the at least one non-terrestrial network node for one or more user equipment (UEs).

In some embodiments, the indication of resources may be received from the non-terrestrial network node as a list of scheduled resource blocks (RBs) for at least one user equipment in an area of coverage overlap between the apparatus 20 and the non-terrestrial network node. For example, the list of the scheduled RBs may be received in a relative narrowband transmit power information element. According to a further embodiment, the indication of resources may be received from the non-terrestrial network node as a list of assigned resource blocks (RBs) for at least one user equipment in an area of coverage overlap between the apparatus 20 and the non-terrestrial network node.

According to an embodiment, apparatus 20 may be controlled by memory 24 and processor 22 to use at least the round trip time (RTT) information and the received indication of the scheduled resources to coordinate interference mitigation with the at least one non-terrestrial network node. For example, apparatus 20 may be configured to use the RTT information to perform interference coordination action(s), such as scheduling orthogonal resources, using different power settings and/or using different modulation and coding on the resources indicated by the non-terrestrial network node in the slots indicated by the RTT. In an embodiment, the interference coordination action(s) performed by apparatus 20 may include reducing downlink power in the resource blocks (RBs) indicated by the at least one non-terrestrial network node or avoiding scheduling user equipment (UEs) that will be interfered by the non-terrestrial network node in the indicated resource blocks (RBs), and/or using a more robust coding and modulation scheme (MCS) in the indicated resource blocks (RBs) than in other resource blocks (RBs). In a further embodiment, the interference coordination action(s) performed by the apparatus 20 may include assigning non-overlapping resources such that resource blocks (RBs) that are being interfered by user equipment (UEs) served by the non-terrestrial network node at slots indicated through the round trip time (RTT) are not used by user equipment (UEs) served by the apparatus 20, and/or using a more robust coding and modulation scheme (MCS) for resource blocks (RBs) that are being interfered by user equipment (UEs) served by the non-terrestrial network node at slots indicated through the round trip time (RTT). In some embodiments, apparatus 20 may be controlled by memory 24 and processor 22 to periodically transmit, to the non-terrestrial network node, an indication of scheduling decisions made at the apparatus 20.

In some embodiments, an apparatus (e.g., apparatus 10 and/or apparatus 20) may include means for performing a method or any of the variants discussed herein, e.g., a method described with reference to FIG. 4. Examples of the means may include one or more processors, memory, and/or computer program code for causing the performance of the operation.

Therefore, certain example embodiments provide several technological improvements, enhancements, and/or advantages over existing technological processes and constitute an improvement at least to the technological field of wireless network control and management. Slot by slot coordination between neighbor gNBs is an issue due to backhaul latency requirements. In certain embodiments described herein, higher latency backhaul can be used (latency comparable with RTT/2). In addition, as HAPS RTT changes, either due to HAPS movement or feeder link changes, interference profile changes. Certain embodiments can take the RTT changes into account to coordinate resources and mitigate interference. Further, no advanced beamforming capabilities are required at HAPS to steer the RF beams away from interfered TN UEs. Beam steering/selection based HAPS can also benefit from example embodiments described herein. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A method, comprising:
   exchanging, by a non-terrestrial network node, round trip time (RTT) information with at least one terrestrial network node;
   informing the at least one terrestrial network node of resources scheduled at the non-terrestrial network node for one or more user equipment (UEs) to coordinate interference mitigation with the at least one terrestrial network node;
   wherein the informing comprises informing about a list of scheduled resource blocks (RBs) for at least one user equipment in an area of coverage overlap between the terrestrial network node and the non-terrestrial network node.

2. The method according to claim 1, further comprising estimating a maximum round trip time (RTT) from a cell edge user equipment.

3. The method according to claim 1, further comprising:
   obtaining a location of the at least one terrestrial network node from a core network; and
   estimating the area of coverage overlap with the at least one terrestrial network node.

4. The method according to claim 3, wherein the informing comprises taking into account scheduled user equipment location and the location of the at least one terrestrial network node.

5. The method according to claim 1, further comprising:
   estimating a location of the one or more user equipment (UEs) based on a timing advance; and
   tracking timing advance commands issued to the one or more user equipment (UEs) to keep an estimate of the location of the one or more user equipment (UEs) and the round trip time (RTT).

6. The method according to claim 1, wherein the sending comprises sending the list of scheduled resource blocks (RBs) in a relative narrowband transmit power information element.

7. The method according to claim 1, further comprising receiving an indication of scheduling decisions from the at least one terrestrial network node.

8. A non-transitory computer readable medium storing a program of instructions, execution of which by a processor configures an apparatus to at least to perform the method of claim 1.

9. An apparatus, comprising:
   at least one processor; and
   at least one memory comprising computer program code,
   the at least one memory and computer program code configured, with the at least one processor, to cause the apparatus at least to
   exchange round trip time (RTT) information with at least one terrestrial network node;
   inform the at least one terrestrial network node of resources scheduled at the apparatus for one or more user equipment (UEs) to coordinate interference mitigation with the at least one terrestrial network node;
   wherein the informing comprises informing about a list of scheduled resource blocks (RBs) for at least one user equipment in an area of coverage overlap between the terrestrial network node and the non-terrestrial network node.

10. The apparatus according to claim 9, wherein the at least one memory and computer program code are configured, with the at least one processor, to cause the apparatus at least to estimate a maximum round trip time (RTT) from a cell edge user equipment.

11. The apparatus according to claim 9, wherein the at least one memory and computer program code are configured, with the at least one processor, to cause the apparatus at least to:
    obtain a location of the at least one terrestrial network node from a core network; and
    estimate the area of coverage overlap with the at least one terrestrial network node.

12. The apparatus according to claim 9, wherein the at least one memory and computer program code are configured, with the at least one processor, to cause the apparatus at least to:
    estimate a location of the one or more user equipment (UEs) based on a timing advance; and
    track timing advance commands issued to the one or more user equipment (UEs) to keep an estimate of the location of the one or more user equipment (UEs) and the round trip time (RTT).

13. The apparatus according to claim 11, wherein the informing comprises taking into account scheduled user equipment location and the location of the at least one terrestrial network node.

14. The apparatus according to claim 9, wherein the at least one memory and computer program code are configured, with the at least one processor, to cause the apparatus at least to send the list of scheduled resource blocks (RBs) in a relative narrowband transmit power information element.

15. The apparatus according to claim 9, wherein the at least one memory and computer program code are configured, with the at least one processor, to cause the apparatus at least to:
    receive an indication of scheduling decisions from the at least one terrestrial network node.

16. A method, comprising:
    exchanging, by a terrestrial network node, round trip time (RTT) information with at least one non-terrestrial network node;

receiving, from the at least one non-terrestrial network node, an indication of resources scheduled at the at least one non-terrestrial network node for one or more user equipment (UEs); and using at least the round trip time (RTT) information and the received indication of the scheduled resources to coordinate interference mitigation with the at least one non-terrestrial network node;

wherein the receiving comprises receiving a list of scheduled resource blocks (RBs) for at least one user equipment in an area of coverage overlap between the terrestrial network node and the non-terrestrial network node.

17. The method according to claim 7, wherein the receiving comprises receiving the list of scheduled resource blocks (RBs) in a relative narrowband transmit power information element.

18. The method according to claim 16, wherein the using comprises at least one of:
reducing downlink power in the resource blocks (RBs) indicated by the at least one non-terrestrial network node or avoiding scheduling user equipment (UEs) that will be interfered by the non-terrestrial network node in the indicated resource blocks (RBs); or
using a more robust coding and modulation scheme (MCS) in the indicated resource blocks (RBs).

19. The method according to claim 16, wherein the using comprises at least one of:
assigning non-overlapping resources such that resource blocks (RBs) that are being interfered by user equipment (UEs) served by the non-terrestrial network node at slots indicated through the round trip time are not used by user equipment (UEs) served by the terrestrial network node; or
using a more robust coding and modulation scheme (MCS) for resource blocks (RBs) that are being interfered by user equipment (UEs) served by the non-terrestrial network node at slots indicated through the round trip time.

20. The method according to claim 16, further comprising transmitting, to the non-terrestrial network node, an indication of scheduling decisions made at the terrestrial network node.

21. A non-transitory computer readable medium storing a program of instructions, execution of which by a processor configures an apparatus to at least to perform the method of claim 16.

22. An apparatus, comprising:
at least one processor; and
at least one memory comprising computer program code, the at least one memory and computer program code configured, with the at least one processor, to cause the apparatus at least to exchange round trip time (RTT) information with at least one non-terrestrial network node;

receive, from the at least one non-terrestrial network node, an indication of resources scheduled at the at least one non-terrestrial network node for one or more user equipment (UEs); and use at least the round trip time (RTT) information and the received indication of the scheduled resources to coordinate interference mitigation with the at least one non-terrestrial network node;

wherein the receiving comprises receiving a list of scheduled resource blocks (RBs) for at least one user equipment in an area of coverage overlap between the terrestrial network node and the non-terrestrial network node.

23. The apparatus according to claim 22, wherein the list of scheduled resource blocks (RBs) is received in a relative narrowband transmit power information element.

24. The apparatus according to claim 22, wherein, to coordinate the interference mitigation, the at least one memory and computer program code are configured, with the at least one processor, to cause the apparatus to perform at least one of:
reduce downlink power in the resource blocks (RBs) indicated by the at least one non-terrestrial network node or avoiding scheduling user equipment (UEs) that will be interfered by the non-terrestrial network node in the indicated resource blocks (RBs); or
use a more robust coding and modulation scheme (MCS) in the indicated resource blocks (RBs).

25. The apparatus according to claim 22, wherein, to coordinate the interference mitigation, the at least one memory and computer program code are configured, with the at least one processor, to cause the apparatus to perform at least one of:
assign non-overlapping resources such that resource blocks (RBs) that are being interfered by user equipment (UEs) served by the non-terrestrial network node at slots indicated through the round trip time are not used by user equipment (UEs) served by the terrestrial network node; or
use a more robust coding and modulation scheme (MCS) for resource blocks (RBs) that are being interfered by user equipment (UEs) served by the non-terrestrial network node at slots indicated through the round trip time.

26. The apparatus according to claim 22, further comprising transmitting, to the non-terrestrial network node, an indication of scheduling decisions made at the terrestrial network node.

* * * * *